(12) United States Patent
Thurston

(10) Patent No.: US 12,171,328 B2
(45) Date of Patent: Dec. 24, 2024

(54) TWO-TIER STORAGE SYSTEMS FOR TRAILERS

(71) Applicant: Richard A. Thurston, Brookfield, WI (US)

(72) Inventor: Richard A. Thurston, Brookfield, WI (US)

(*) Notice: Subject to any disclaimer, the term of this patent is extended or adjusted under 35 U.S.C. 154(b) by 261 days.

(21) Appl. No.: 17/976,826

(22) Filed: Oct. 30, 2022

(65) Prior Publication Data

US 2024/0074577 A1  Mar. 7, 2024

Related U.S. Application Data

(60) Provisional application No. 63/403,666, filed on Sep. 2, 2022.

(51) Int. Cl.
| | | |
|---|---|---|
| A47B 47/02 | (2006.01) |
| B60P 1/64 | (2006.01) |
| B62D 33/04 | (2006.01) |
| B65D 88/52 | (2006.01) |
| B65G 67/04 | (2006.01) |

(52) U.S. Cl.
CPC .......... *A47B 47/025* (2013.01); *B60P 1/6418* (2013.01); *B62D 33/04* (2013.01); *B65D 88/524* (2013.01); *B65G 67/04* (2013.01)

(58) Field of Classification Search
CPC ........ A47B 47/025; B60P 1/6418; B60P 1/04; B62D 33/04; B65D 88/524; B65D 90/08; B65D 88/58; B65G 67/04
See application file for complete search history.

(56) References Cited

U.S. PATENT DOCUMENTS

| | | |
|---|---|---|
| 3,217,449 A | 11/1965 | Levere |
| 5,292,012 A | 3/1994 | Davis et al. |
| 5,819,933 A | 10/1998 | Hernandez |
| 7,296,697 B2 | 11/2007 | Costa et al. |

(Continued)

FOREIGN PATENT DOCUMENTS

| | | |
|---|---|---|
| DE | 202004014355 U1 | 2/2005 |
| DE | 202014007896 U1 | 4/2015 |
| JP | 2015071452 A | 4/2015 |

OTHER PUBLICATIONS

PCT "International Search Report" and "Written Opinion of the International Searching Authority" for PCT/US2023/031389 of Nov. 16, 2023, 13 pages.

(Continued)

*Primary Examiner* — Andrew D Perreault
(74) *Attorney, Agent, or Firm* — Amundsen Davis, LLC

(57) ABSTRACT

Storage structures suitable for being mounted on a trailer or truck, and for holding heavy, large format goods, are disclosed. The storage structures have at least a two-tier construction, in which metal rails or the like are assembled into three panels that are spaced apart to define two adjacent storage compartments or cages, one sized to hold mats, sheets, or the like, and the other tailored to support the first compartment and provide additional storage. The storage compartments may have equal lengths but different widths. The storage structures may include at least one pair of parallel fork tubes, or two orthogonally oriented pairs of fork tubes, to allow the storage structure to be picked up by a forklift truck on one, two, or more sides of the storage structure. The structures may also include lifting lugs, and one or more pull-out units.

20 Claims, 13 Drawing Sheets

(56) References Cited

U.S. PATENT DOCUMENTS

| | | | |
|---|---|---|---|
| 7,866,491 | B2 | 1/2011 | Newman |
| 2002/0190019 | A1 | 12/2002 | Reddig |
| 2004/0007889 | A1 | 1/2004 | Herbert |
| 2011/0303129 | A1 | 12/2011 | Harris |
| 2020/0323340 | A1 | 10/2020 | Nilsson et al. |

OTHER PUBLICATIONS

All In One Wall Shelves Quadrangular Shelves . . . , https://m.made-in-china.com/product/All-in-One-Wall-Shelves-Quadrangular-Shelves-Wall-Mounted-Shevling-Metal-Frame-Rustic-Wood-Modern-Rectangle-Floaing-Wall-Shelf-for-Living-Room-Decor-Bathroom-1928575015.html, May 31, 2022 or earlier, 10 pages.

Hiba 2-Shelf Wall Storage Unit, https://www.laredoute.com/ppdp/prod-350139314.aspx, May 31, 2022 or earlier, 3 pages.

Plywood Storage Rack, https://3dwarehouse.sketchup.com/model/961d1731-9736-45b4-a4dc-0e88e0300d4a/Plywood-Storage-Rach?hl=en , May 31, 2022 or earlier, 1 page.

Triple-Threat Storage for Lumber, Scraps, and Sheet Goods . . . , https://www.woodmagazine.com/project-plans/workshop-jig/shop-cabinets-storage-organizers/triple-threat-storage-for-lumber-scraps, May 31, 2022 or earlier, 2 pages.

TWO-TIER STORAGE SYSTEMS FOR TRAILERS

CROSS REFERENCE TO RELATED APPLICATIONS

This application claims priority under 35 USC § 119(e) to provisional application 63/403,666, "Two-Tier Storage System for Trailers", filed Sep. 2, 2022, the contents of which are incorporated by reference.

FIELD OF THE INVENTION

The present invention relates to storage structures and systems, with particular application to such structures and systems suitable for being carried on the flat surface of a trailer or truck, and for holding large and/or heavy objects such as construction materials or the like. The invention also pertains to related methods, systems, and articles.

BACKGROUND OF THE INVENTION

Trailers are wheeled, non-motorized machines designed to carry big, heavy things and to be pulled behind cars, trucks, or other motorized vehicles. Numerous types of trailers are known. One category of trailers is referred to as flatbed trailers. Flatbed trailers are typically characterized by a horizontal deck, no roof, and no sides, or possibly with minimal sides. Within this category there are many trailer sub-types, such as: standard flatbed, single drop trailer (stepdeck), double drop trailers, double drop with detachable deck trailers (lowboy), stretch flatbeds, stretch single-drop, stretch double-drop, and tilt flatbed trailers. Tilt flatbed trailers ("tilt trailers") can operate based solely on gravity (gravity tilt) or they may employ a hydraulic pump and cylinder (power tilt) to lift and lower a given end of the deck.

Highly schematic drawings of conventional tilt trailers are shown in FIGS. 1 and 2. In FIG. 1, a tilt trailer 110 includes a frame 111 to which is attached, at one end, a hitch 112, and at or near another end, wheels 114. Also supported by the frame 111 is a deck 115 on which to load equipment, construction materials, or other large or heavy goods. The deck 115 is made up of a relatively small stationary deck portion 116, and a larger, moveable portion, which we refer to as the tilt deck 117. In FIG. 1, the tilt deck is shown in a deployed (tilted) orientation. The stationary deck 116 is rigidly attached to the frame 111, with no ability to pivot or rotate like the tilt deck 117. Short walls or gates may be provided to prevent items from sliding off the deck 115, such as wall 118 at the front of the stationary deck 116.

A side view of a conventional tilt trailer 210, which may be the same as or similar to the trailer of FIG. 1, is shown in FIG. 2. Here, items with similar reference numbers to those in FIG. 1 refer to the same or similar feature or item: item 211 refers to a frame which may be the same as or similar to frame 111; item 212 refers to a hitch which may be the same as or similar to hitch 112; item 214 refers to wheels which may be the same as or similar to wheels 114; and so forth.

In FIG. 2, the tilt deck 217 is shown in solid lines in its transport, or non-tilted, orientation, and is shown in dashed lines in its tilted orientation. When the tilt deck 217 is in its non-tilted orientation, it is substantially aligned, or coplanar, with the stationary deck 216. A small gap separates the stationary deck from the tilt deck when the tilt deck is horizontal.

One known use of a conventional tilt trailer will now be described in connection with FIG. 3. There, a tilt trailer 310 is shown that may be the same as or similar to the tilt trailers of FIG. 1 or 2. The tilt trailer 310 may thus include a frame 311, hitch 312, wheels 314, deck 315, stationary deck 316, tilt deck 317, and wall 318, substantially as described above. The user may have a business for doing yard work, tree removal, landscaping, paving, roofing, siding, masonry, remodeling, construction, or the like. In such a business, the user may use the trailer 310 to transport materials and moveable equipment to and from the job site. The moveable equipment, which is shown only schematically in the figure with reference numbers 301a, 301b, often includes its own wheels (and sometimes its own motor or engine) for transport, and may include such things as stump grinders, wood chippers, tractors, front-end loaders, backhoe loaders, tractors, scissor lifts, forklift trucks, wagons, wheelbarrows, dollies (hand trucks), or the like.

It is often necessary to transport such moveable equipment, or the trailer itself, back and forth from the trailer 310 to the job site, along a path that traverses well-manicured lawns or other delicate terrain. For that reason, the user also carries on the trailer 310 a stack of sheets or mats 302 for ground protection. The mats 302 are referred to as ground cover mats or ground protection mats, and may be or comprise anything from simple plywood sheets to more specialized sheets made out of suitable polymer materials or the like, including for example AlturnaMATS™ ground cover mats available from AlturnaMats, Inc. of Titusville, PA. The mats 302 are typically 4 feet in width and 8 feet in length, and may weigh as much as 85 pounds each. Upon arriving at the work site, workers unload the mats 302 one-by-one and lay them end-to-end to form a path from the trailer to the job site to allow equipment to be moved from point to point across the mats without damaging the underlying delicate terrain.

In many cases, the stationary deck 316 of the trailer 310 has transverse dimensions that are the same or about the same as those of the mats 302, e.g., 4 feet by 8 feet. The user may keep a stack of these mats strapped down on the stationary deck of the tilt trailer, and unstrap them upon arrival at the work site. Then, at the end of the day or after the work is done, the workers may carry each one of the mats all the way back to the trailer 310.

SUMMARY OF THE INVENTION

We have developed a family of storage structures and systems that can be used in work situations described above that involve tilt trailers and stacks of ground protection mats, but they may also be used in other situations that may or may not involve tilt trailers or other types of trailers, and may or may not involve ground protection mats, or other mats, sheets, panels, or the like.

The storage structures are generally of sturdy construction suitable for holding hundreds of pounds of 4×8 foot mats or other large format goods without break or rupture. The storage structures have a unique two-tier construction, in which metal rails or other suitable components are assembled into three panels that are spaced apart to define two adjacent storage compartments or cages, one sized to hold the mats, sheets, or the like, and the other tailored to support the first compartment and provide additional storage capacity. The storage compartments may have substantially equal lengths but substantially different widths. The storage structures preferably incorporate at least one pair of parallel fork tubes, and preferably two orthogonally oriented pairs of fork tubes, to allow the storage structure to be easily picked up by a forklift truck on at least two sides, and preferably on all four sides, of the storage structure. The storage structures also preferably incorporate lifting lugs to allow coupling to the hooks of an overhead crane.

We therefore disclose, among other things, storage structures that include a first panel, a second panel, and spacer bars that connect the first panel to the second panel to form a first compartment therebetween. The first panel may be generally rectangular in shape, and have four corners, and include first major rails and first minor rails. The first major rails may be mutually parallel and may include two first major outer rails. The first minor rails may also be mutually parallel and may include two first minor outer rails. The second panel may also be generally rectangular in shape, and have four corners, and include second major rails and second minor rails. The second major rails may be mutually parallel and may include two second major outer rails. The second minor rails may be mutually parallel and may include two second minor outer rails. The first and second panels may have substantially the same overall lengths and widths. The first compartment may have a first and second opposed major side, and a first and second opposed minor side. The storage structure may also include a third panel attached to the second panel such that a second compartment is formed between the third panel and the second panel. The third panel may have an overall length substantially equal to those of the first and second panels, but may have an overall width less than those of the first and second panels.

The first compartment may be in the form of a rectangular cuboid, and the second compartment may be in the form of another rectangular cuboid that is smaller than the first rectangular cuboid along one transverse dimension.

The first spacer bars may include one non-quick-release corner spacer bar at each of the four corners of the first and second panels. The first spacer bars may also include a first group of quick-release spacer bars. The first group of quick-release spacer bars may selectively obstruct the first minor side of the first compartment. A second group of quick-release spacer bars may selectively obstruct the first major side of the first compartment.

The first spacer bars may also include non-quick-release spacer bars that obstruct the second major side of the first compartment between two corner spacer bars, and non-quick-release spacer bars that obstruct the second minor side of the first compartment between two corner spacer bars. Each of the quick-release spacer bars may be connected to one of the first and second panels by a hinge, and to the other of the first and second panels by a quick-release mechanism such as a pin, latch, hook, slot, lock, or other suitable mechanism that can be engaged and disengaged by hand.

The storage structure may also include two major fork tubes extending parallel to the first major rails of the first panel, each of the major fork tubes being configured to receive a fork of a forklift truck. The two major fork tubes may be part of the third panel. The storage structure may also include two minor fork tubes extending parallel to the first minor rails of the first panel. Each of the minor fork tubes may be configured to receive a fork of a forklift truck. The two minor fork tubes may be disposed between the second panel and the third panel.

The storage structure may also include a pullout section that includes two generally parallel engagement arms and a handle that connects the engagement arms, the engagement arms being adapted to slidingly mate with two of the second major rails or two of the second minor rails. The second major rails may include two second major inner rails disposed parallel to and between the two second major outer rails, and the engagement arms may be adapted to slidingly mate with the two second major inner rails. One of the two second minor outer rails may include three collinear but separated rail components, one of the separated rail components being the handle of the pullout section. The pullout section may also include two generally parallel leg members that are oriented perpendicular to the engagement arms and perpendicular to the handle.

The storage structure may also include a generally rectangular fourth panel having four corners, and including fourth major rails and fourth minor rails, the fourth major rails being mutually parallel and including two fourth major outer rails, the fourth minor rails being mutually parallel and including two fourth minor outer rails. The first and fourth panels may have substantially the same overall lengths and widths. Second spacer bars may be used to connect the first panel to the fourth panel such that the first panel is disposed between the fourth panel and the second panel, wherein a third compartment is formed between the first panel and the fourth panel.

We also disclose storage structures that include at least a first, second, and third panel being disposed such that a first compartment is formed between the first panel and the second panel, and a second compartment is formed between the second panel and the third panel, the first compartment having a first and second opposed major side and a first and second opposed minor side. The first panel may be generally rectangular in shape, having four corners, with first major rails and first minor rails, the first major rails including two first major outer rails and at least one first major inner rail between the two first major outer rails. The first minor rails may include two first minor outer rails and a plurality of first minor inner rails between the two first minor outer rails. The second panel may be generally rectangular in shape, with four corners, and with second major rails and second minor rails, the second major rails including two second major outer rails and at least one second major inner rail between the two second major outer rails, the second minor rails including two second minor outer rails and a plurality of second minor inner rails between the two second minor outer rails. First spacer bars may be used to connect the first panel to the second panel. The storage structure may also include a pullout unit that includes two engagement arms and a handle that connects the engagement arms, the engagement arms being adapted to slidingly mate with two of the rails of the second panel.

The third panel may have an overall length substantially equal to those of the first and second panels, and may have an overall width less than those of the first and second panels. The first spacer bars may include one non-quick-release corner spacer bar at each of the four corners of the first and second panels, and may also include a first group of quick-release spacer bars disposed between a first pair of the non-quick-release corner spacer bars.

The engagement arms may slidingly mate with two of the second major rails, or two of the second minor rails. The pullout unit may also include two leg members that are each oriented perpendicular to the engagement arms, and perpendicular to the handle. The storage structure may also include two major fork tubes extending parallel to the first major rails of the first panel, or parallel to the first minor rails of the first panel, each of the major fork tubes being configured to receive a fork of a forklift truck.

We disclose numerous related methods, systems, and articles.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The inventive articles, systems, and methods are described in further detail with reference to the accompanying drawings, of which.

In the figures, like reference numerals designate like elements.

DETAILED DESCRIPTION OF ILLUSTRATIVE EMBODIMENTS

As noted above, we have developed a new family of storage systems that have particular utility in the storage of large format goods, including construction materials. The systems may be specially adapted for use with tilt trailers that have a stationary deck portion, in applications where the trailer is needed to carry, among other things, stacks of ground protection mats or the like. But the systems may also be used in other applications that may not involve tilt trailers or stacks of ground protection mats.

The systems generally involve storage structures that have exactly, or at least, two storage compartments or cages arranged in two layers or tiers, e.g., an upper compartment and a lower compartment. The compartments may be of open frame construction and may thus have a cage-like appearance. However, screens, sheets, skins, or the like can be used to cover one or more sides of the compartments as desired. The storage compartments may have equal lengths but different widths. The storage structures may include at least one pair of parallel fork tubes, or two orthogonally oriented pairs of fork tubes, to allow the storage structure to be readily picked up by a forklift truck on either of two opposed or adjacent sides, or on any of the four sides of the storage structure. The storage structures may also include lifting lugs to allow coupling to the hooks of an overhead crane.

Figure 4A:
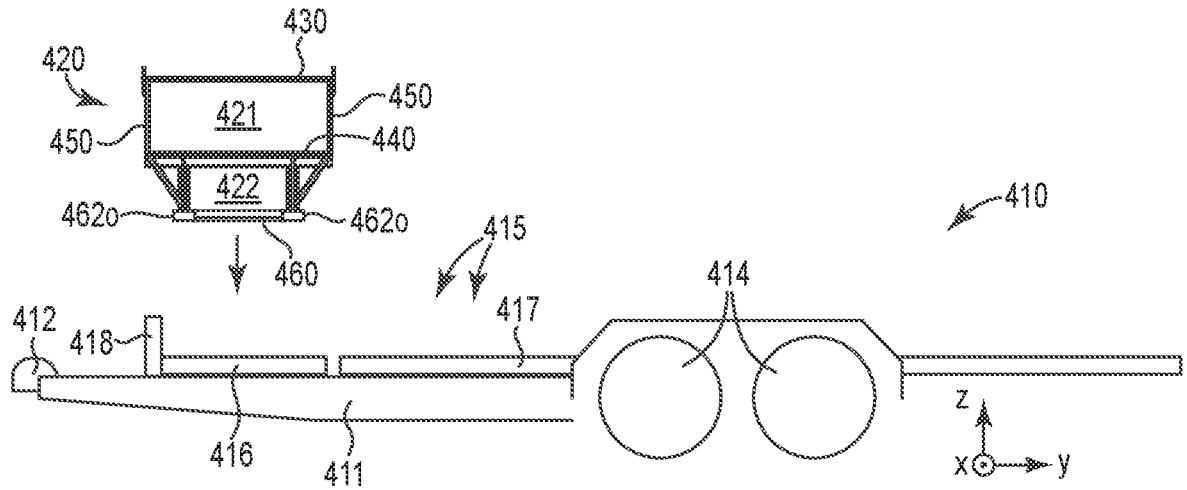
FIG. 4a is a schematic side or elevation view of a two-tier storage structure being lowered onto a tilt trailer.

A representative two-tier storage structure 420 is shown schematically in FIG. 4a together with a tilt trailer 410. The tilt trailer 410 may have a frame 411, hitch 412, wheels 414, deck 415, stationary deck 416, tilt deck 417, and wall 418, substantially as described above. We now add to this tilt trailer 410 our storage structure 420. The storage structure has a first panel 430 and a second panel 440 spaced apart from each other in a parallel configuration by spacer bars 450. A first interior storage space or compartment 421 is thus defined between the panels 430, 440, such compartment having the general shape of a rectangular cuboid. The compartment 421 may be sized to hold 4×8 foot mats or sheets snugly without too much extra space on the sides to avoid excessive jostling of the mats back and forth or side to side during transport.

The storage structure also includes a third panel 460, which is connected to the second panel 440 and held in parallel relation thereto to define a second interior storage space or compartment 422. A second set of spacer bars connect the third panel 460 to the second panel 440. The third panel may employ for its two major outer rails 462o, 462o fork tubes, i.e., hollow metal tubes or pipes with sufficient strength and a rectangular cross-section sized to receive the forks of a forklift truck. This allows a forklift truck to engage the storage structure 420 from the side of the trailer, and lift it off of the trailer (or set it onto the trailer) and move it to wherever it is needed.

The second compartment 422 and the third panel 460 may have a transverse dimension along the y-axis in the figure, which we may refer to as a width, that is substantially less than the corresponding width of the first compartment 421 and the panels 430 or 440. On the other hand, the second compartment 422 and the third panel 460 may have a transverse dimension along the x-axis in the figure (perpendicular to the plane of the figure), which we may refer to as a length, that is substantially the same as the corresponding length of the first compartment 421 and the panels 430,440.

Figure 1:
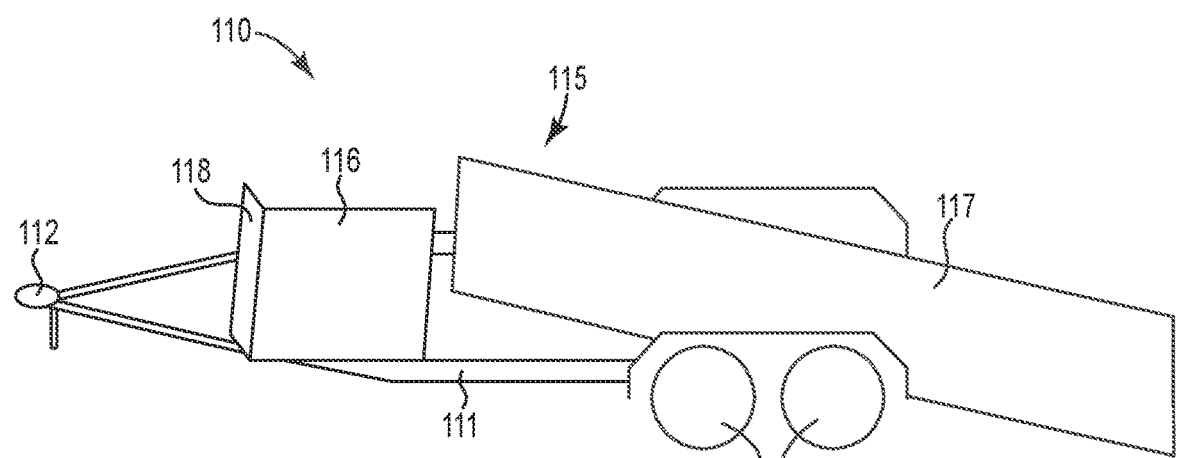
FIG. 1 is a schematic perspective view of a PRIOR ART tilt trailer.
Figure 2:
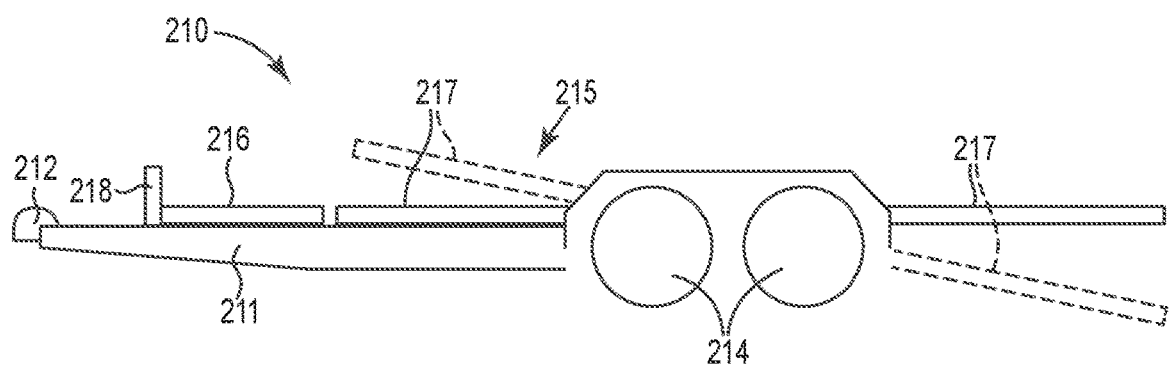
FIG. 2 is a schematic side or elevation view of a PRIOR ART tilt trailer.
Figure 3:
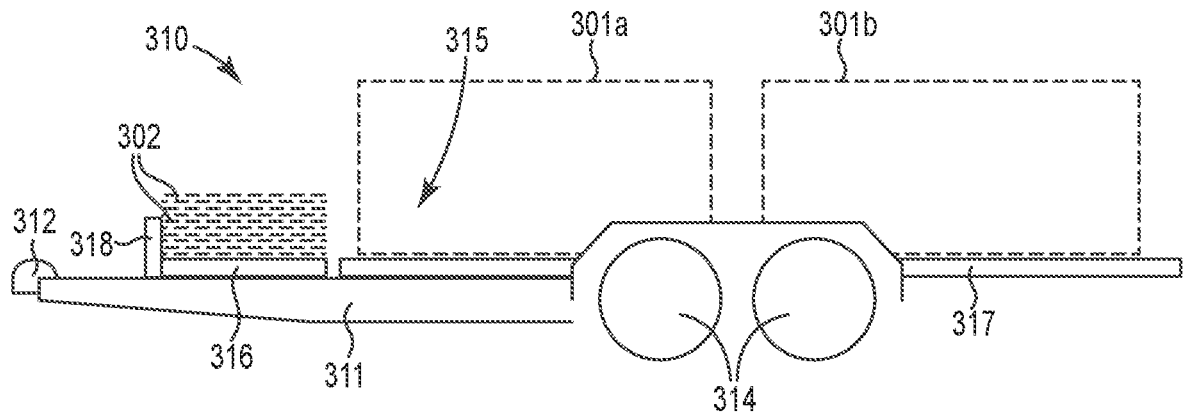
FIG. 3 is a view of a PRIOR ART tilt trailer similar to FIG. 2, but with additional items showing how the trailer is currently used in some applications.
Figure 4B:
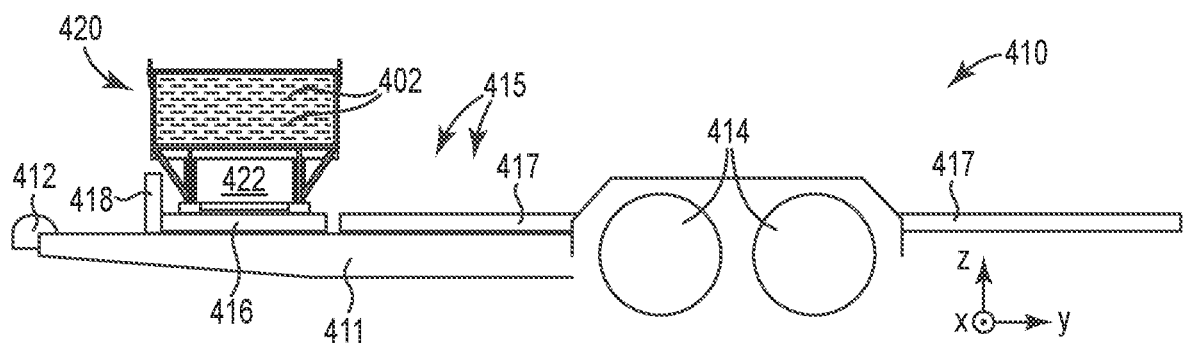
FIG. 4b shows the combination with the storage structure resting on the stationary deck of the tilt trailer.

FIG. 4b shows the same machines and structures as in FIG. 4a, but where the two-tier storage structure 420 now rests atop the stationary deck 416 of the tilt trailer 410. Furthermore, a stack of ground protection mats 402, which may be similar to or the same as mats 302 of FIG. 3, are shown loaded into the first compartment 421. The second compartment 422 thus advantageously provides the user with extra storage space that was not available when the mats were stacked directly on the stationary deck. This can be easily seen by simply comparing FIG. 3 with FIG. 4b. The extra storage space can be used to store or transport other items that would be needed by a work crew, such as tools, tool boxes, chain saws or other motorized or non-motorized handheld equipment, as well as helmets, harnesses, water bottles, and so forth. Solid, perforated, or screened panels, as well as lockable hinged doors, can be secured at the boundaries of the second compartment 422 as desired.

Of course, appropriate brackets, bolts, straps, or other suitable tie-down mechanisms are preferably used to firmly secure the storage structure 420 to the deck 415, and more particularly to the stationary deck 416, of the tilt trailer 410. Such tie-down mechanisms are preferably of the type that can be easily removed or undone, to allow the storage structure 420 to be removed from the deck 415 after arrival at the job site.

Figure 5A:
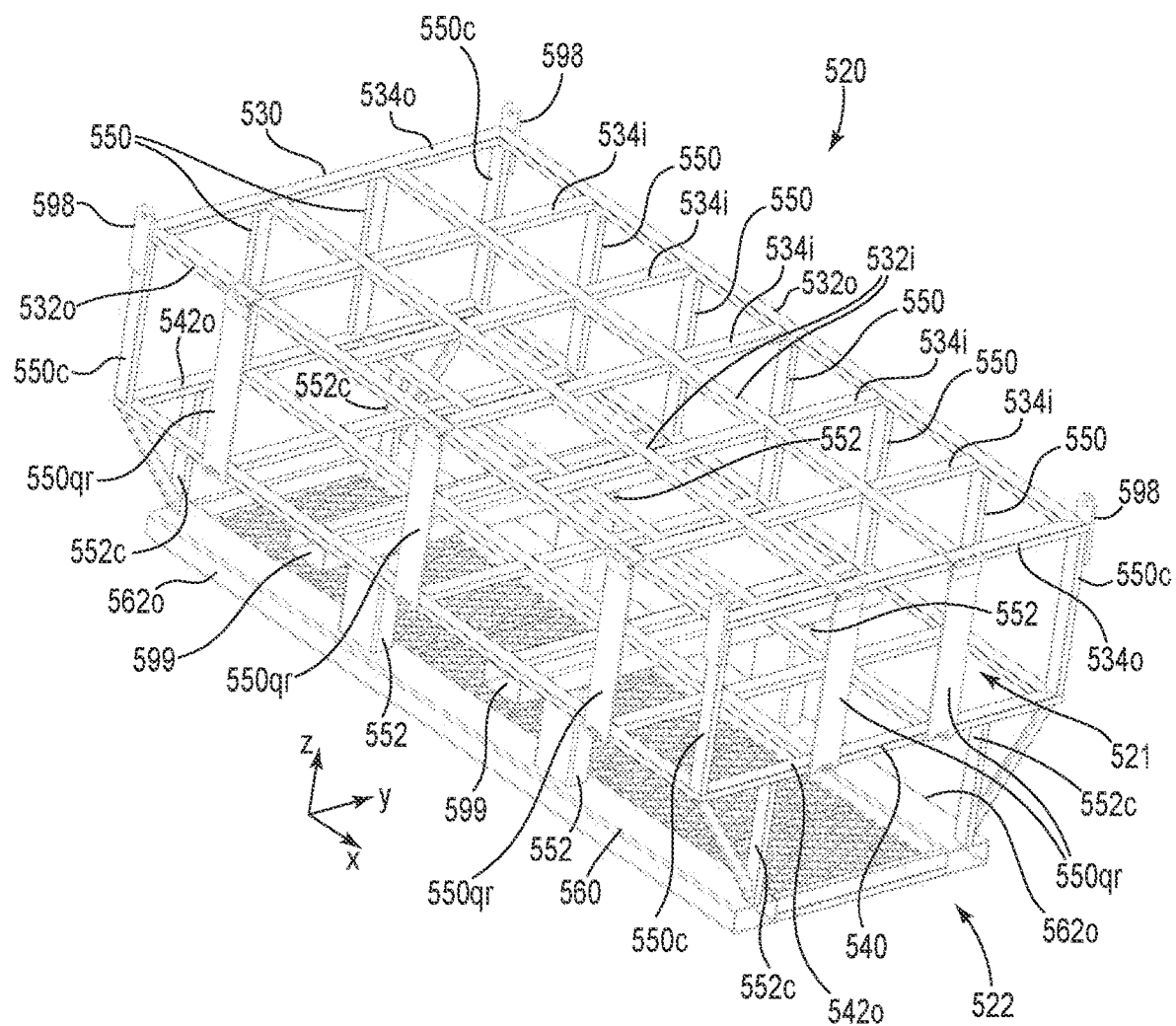
FIG. 5a is a schematic perspective view of a two-tier storage structure, which structure is shown in a top view in FIG. 5b, bottom view in FIG. 5c, back side view in FIG. 5d, front side view in FIG. 5e, right side view in FIG. 5f, and left side view in FIG. 5g.

Turning then to FIG. 5a, we see there a two-tier storage structure 520, which may be substantially the same as, or similar to, the storage structure 420 described above. The storage structure 520 has two adjacent storage compartments or cages, a first compartment 521 defined between a first open frame panel 530 and a second open frame panel 540, and a second compartment 522 defined between the second panel 540 and a third panel 560. All or substantially all of the individual components of the storage structure 520 are preferably made of a suitable metal or metal alloy in order to provide the necessary stability and strength needed for holding and transporting large, heavy loads. Metals such as steel, stainless steel, aluminum, alloys thereof, or other suitable metals may be used.

The generally rectangular shape of the panel 530 defines a long dimension, along the x-axis, and a short dimension, along the y-axis. The rails that make up the panel 530 fall into one of two groups: long rails that extend generally parallel to the x-axis, and short rails that extend generally perpendicular to the long rails, i.e., the short rails extend generally parallel to the y-axis. We refer to the long rails as major rails, and the short rails as minor rails. In the embodiment of FIG. 5a, the first panel of the storage structure has four mutually parallel major rails, and seven mutually parallel minor rails. The major rails are identified with reference numbers 532, but we further designate the two major rails at the outer edges of the rectangular structure as major outer rails 532o. The remaining major rails lie between the two outer rails, and are designated major inner rails 532i. Similarly, the minor rails are identified with reference numbers 534, but we further designate the two minor rails at the outer edges of the rectangular structure as minor outer rails 534o. The remaining minor rails lie between the two outer rails, and are designated minor inner rails 534i. The major rails 532 and minor rails 534 are preferably securely and permanently attached to each other at their points of intersection, such as by welding or the like, to provide the panel 530 with a sturdy, robust structural integrity.

The second panel 540 is also preferably generally rectangular in shape and is also composed of rails arranged transversely to each other to provide an open frame design, if desired. The second panel 540 may in fact be substantially the same or similar in design to the first panel 530, with the same numbers of major rails and minor rails, and the same or similar distances, spacings, and orientations of such rails relative to those of the first panel 530. The second panel 540 may also have substantially the same or similar overall length and width as the first panel 530.

The first and second panels 530, 540 are held together in a spaced-apart relationship by means of rigid members we call spacer bars. The spacer bars transmit some, most, or all of the weight of one panel (e.g., panel 530) to the panel immediately below it (e.g., panel 540). The spacer bars may extend orthogonally to the plane of each panel, i.e., they may extend parallel to the z-axis shown in the figure. In that orientation, the spacer bars and panels provide the storage structure 520 with an interior storage space or compartment 521 in the shape of a rectangular cuboid. The spacer bars may include spacer bars 550c, spacer bars 550qr, and spacer bars 550. The spacer bars 550c are located at each of the four corners of the two panels 530, 540. They are preferably solidly and firmly connected to the corner region of each frame, either permanently such as by welding, or semi-permanently such as with heavy duty screws, bolts, or the like. The spacer bars 550 may be permanent or semi-permanent, and are attached in a regularly spaced fashion along one of the major faces or sides of the compartment 521 and along one of its minor faces. On the remaining major face and minor face of the compartment 521, quick-release spacer bars 550qr are provided between the first and second panels. Each quick-release spacer bar 550qr may be attached on one end thereof to one of the two panels by a hinge, and on the other end to the other panel by a quick-release mechanism such as a pin, latch, hook, slot, lock, or other suitable mechanism that can be readily engaged and disengaged by hand. In alternative embodiments, the hinge of each quick-release spacer bar may be replaced by an alternative mechanism that still allows the spacer bar to be quickly released, e.g., by a pin, latch, hook, slot, lock, or other suitable mechanism, which may be the same as or different from the mechanism provided at the opposite end of the given quick-release spacer bar.

The quick-release spacer bars 550qr are provided so that, upon arrival at a job site, the workers can quickly and easily disengage the spacer bars along whichever side of the compartment 521 they wish to remove the mats. Then later after the mats are loaded back into the compartment 521, these spacer bars may be re-engaged to hold the stack of mats in place again on the trailer.

The third panel 560 is also preferably generally rectangular in shape but may have a different aspect ratio than the first or second panels. The third panel 560 may have only two major rails, which would then be its two major outer rails 562o, 562o, with no major inner rails between them. Minor rails 564o, 564i (see e.g. FIG. 5c) are then provided that are orthogonal to the rails 562o and that connect the rails 562o together. Preferably, the major outer rails 562o, 562o of the third panel constitute fork tubes (sometimes referred to as forklift pockets, fork pockets, or fork tunnels) suitably dimensioned and configured to receive the forks of a forklift truck. The separation between the rails 562o may be as wide as possible to provide stability during transport of the structure 520 by a forklift truck, but small enough to remain within the limits of the fork separation distance of ordinary forklift trucks. For example, the rails 562o may have a center-to-center rail spacing in a range from 20 to 60 inches, or 20 to 50 inches, or 20 to 40 inches, or about 30 inches.

The second and third panels 540, 560 are held together in a spaced-apart relationship by means of additional spacer bars, as shown. These additional spacer bars include spacer bars 552c and spacer bars 552. The spacer bars 550c are located at each of the four corners of the panel 560, and attach directly to the respective second minor outer rails 542o of the second panel. The spacer bars 550 may attach indirectly to the second panel through members 599, discussed below. (If the members 599 are omitted, the spacer bars 550 may attach directly to the second panel.) Both types of spacer bars 550c, 550, are preferably solidly and firmly connected, directly or indirectly, to the appropriate rails of the respective panels 540, 560, either permanently such as by welding, or semi-permanently such as with heavy duty screws, bolts, or the like.

A second interior storage space or compartment 522 is thus formed between the second and third panels. The third panel 560 may have substantially the same or similar overall length (along the x-axis) as the first and second panels, but a width (along the y-axis) that is less than those of the first and second panels. Thus, the second compartment 522 would have substantially the same or similar overall length as the first compartment 521 (equal to that of panels 540 and 560), but a width that is substantially less, i.e., only as wide as the panel 560. In alternative embodiments, the panel 560 may be widened so that its width matches or substantially matches that of the panels 540 and 560, in which case the second compartment 522 would have the same or substantially the same width as that of the compartment 521.

An expanded metal mesh or wire mesh grid or screen can be provided as shown at the bottom of the compartment 522, proximate the minor rails 564o, 564i (see FIG. 5c), to form a floor of the compartment. Alternatively, perforated or non-perforated screens, walls, sheets, skins, or the like (e.g. suitably sized pieces of sheet metal) can be used for this purpose.

As shown, the storage structure 520 includes two major fork tubes (rails 5620) extending parallel to the first major rails of the first panel, and two minor fork tubes (599) extending parallel to the first minor rails of the first panel, each of the fork tubes being configured to receive a fork of a forklift truck. The two major fork tubes may form part of the third panel, and the two minor fork tubes may be disposed between the second panel 540 and the third panel 560. In alternative embodiments the two major fork tubes may be incorporated elsewhere on the storage structure, in which case the outer rails of the third panel 560 may be similar or identical to the outer rails of the panels 530 and/or 540. Likewise, the two minor fork tubes may also be incorporated elsewhere on the storage structure, while still allowing for a fork lift truck to engage the storage structure from one of its major sides. The storage structure 520 also includes lifting lugs 598 attached at each of the four corners of the storage structure. This allows the storage structure to be lifted off the trailer and moved by a suitable crane.

Figure 5B:
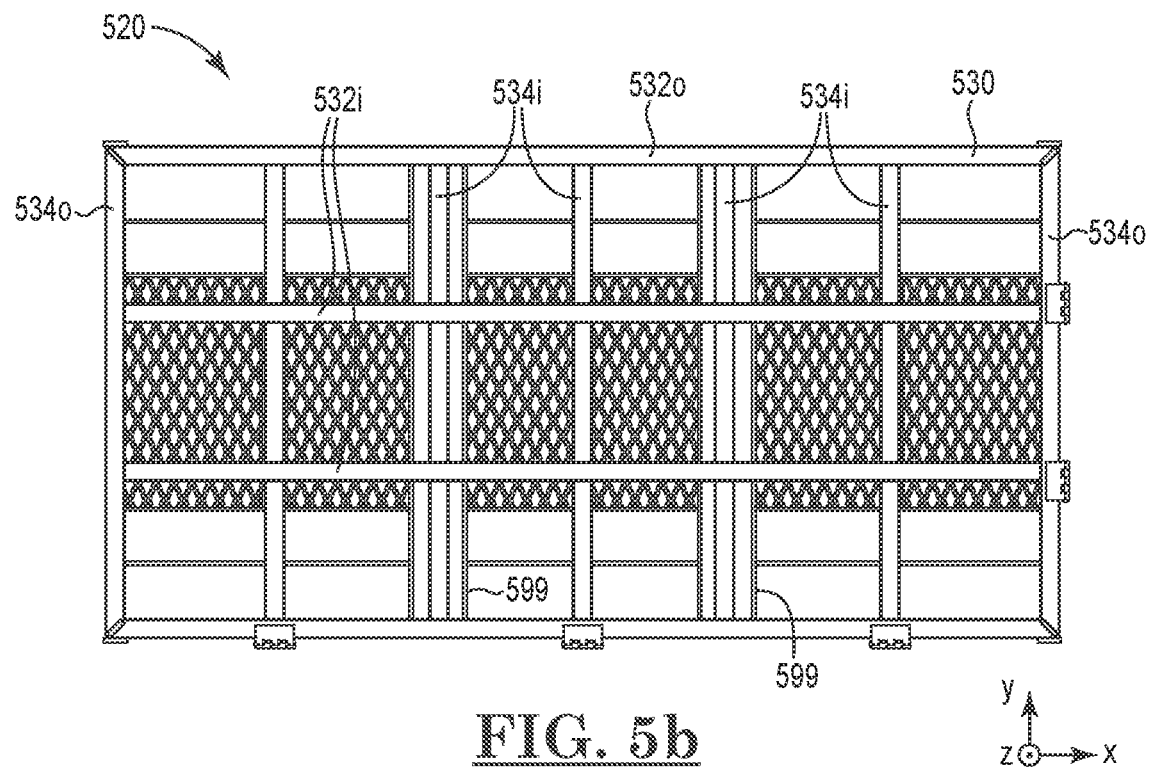
Figure 5C:
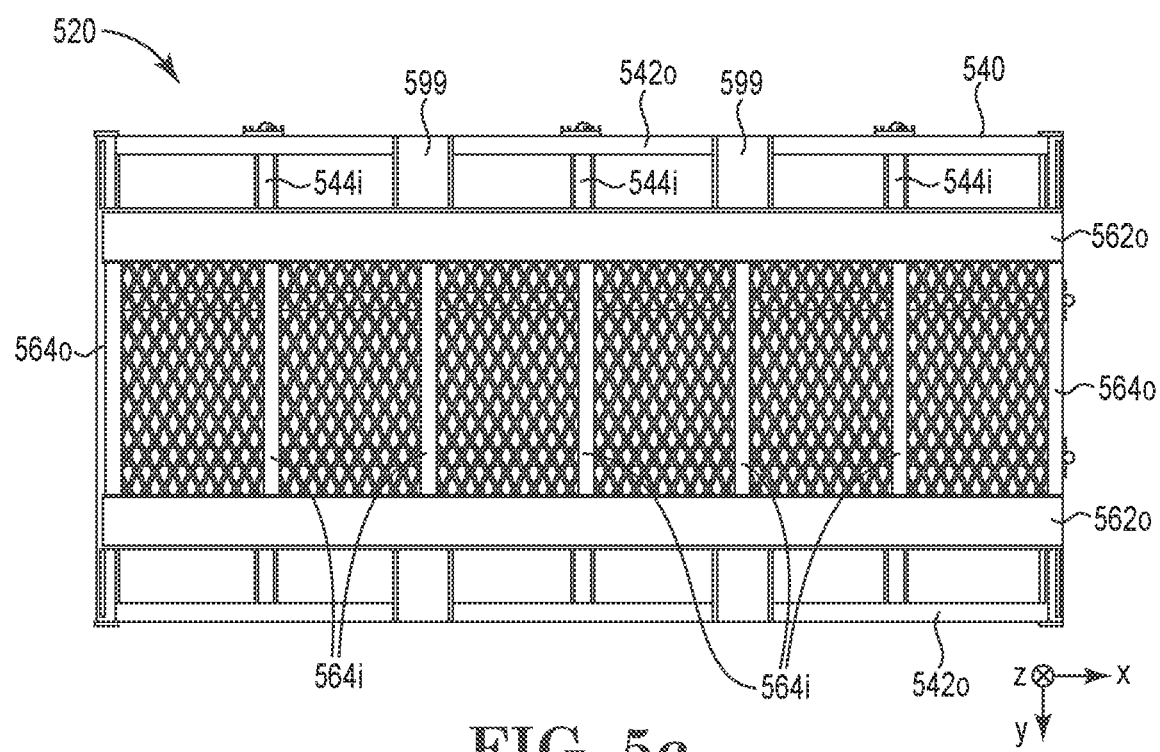
Figure 5D:
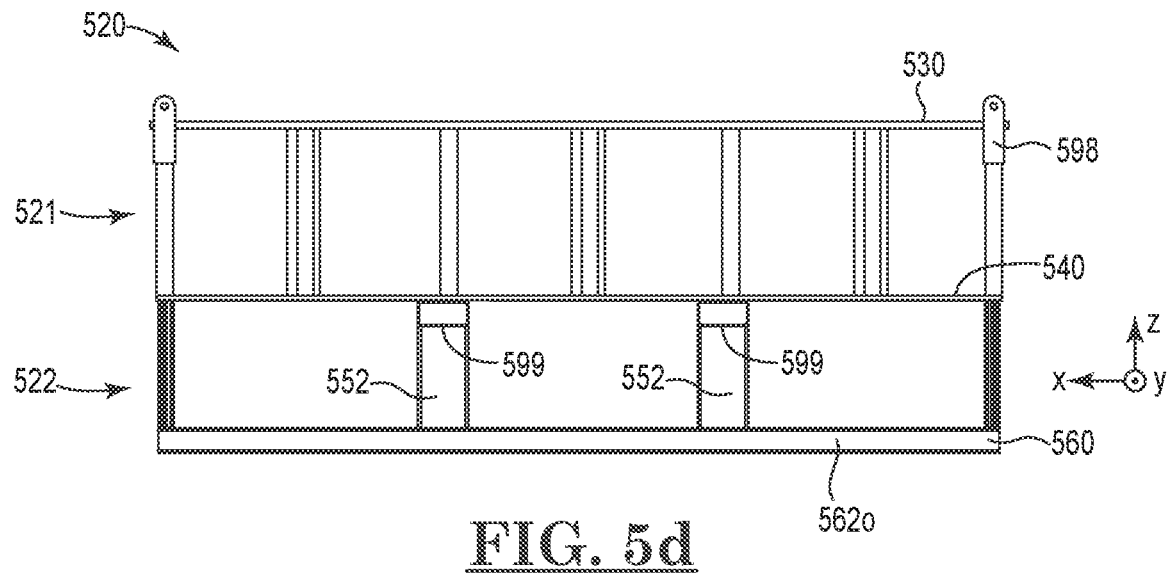
Figure 5E:
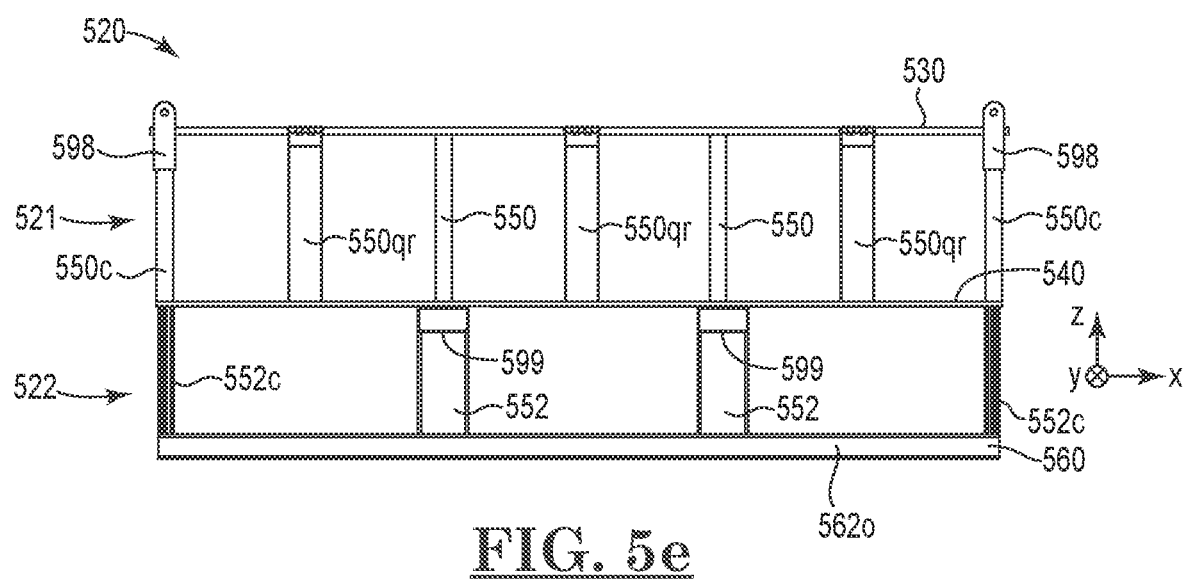
Figure 5F:
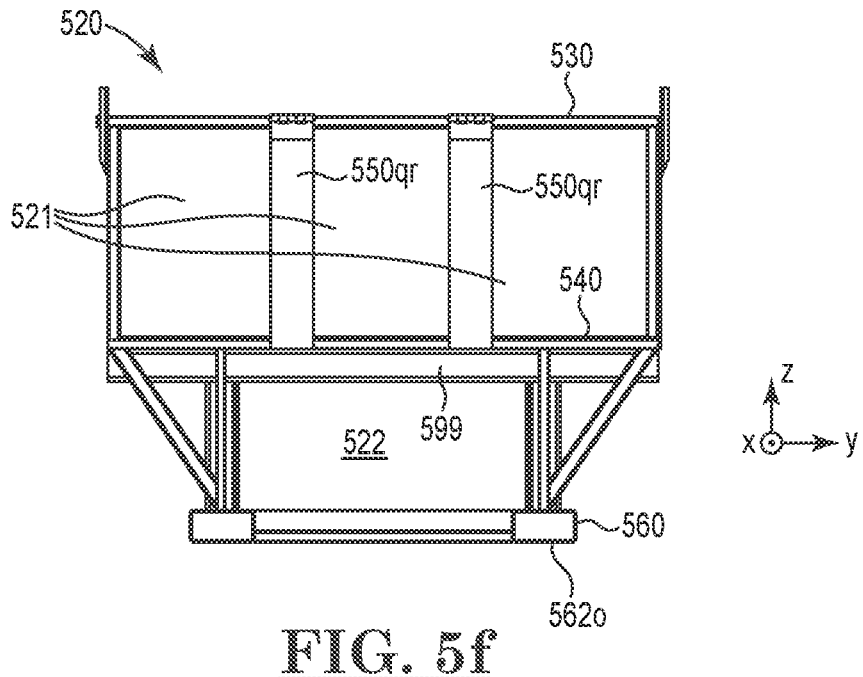
Figure 5G:
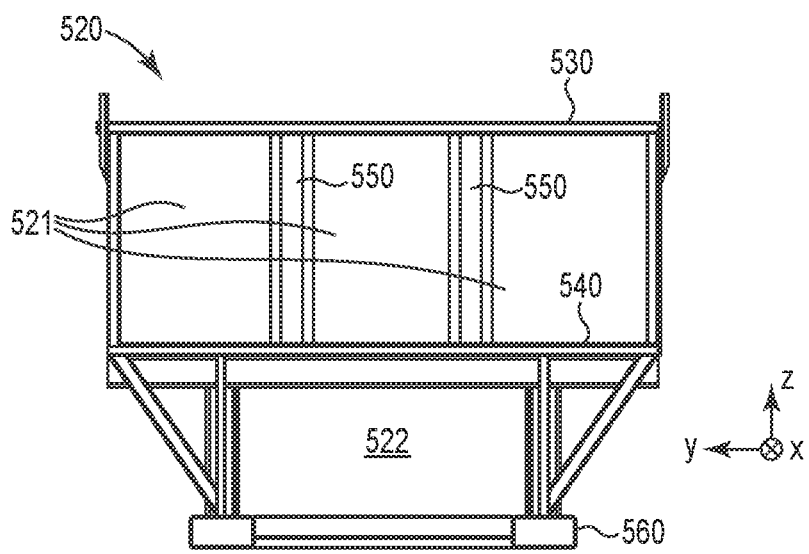

Views of the storage structure 520 from other angles are shown in FIGS. 5b (top view), 5c (bottom view), 5d (back side view), 5e (front side view), 5f (right side view), and 5g (left side view). Like reference numbers correspond to like elements. Hinges (for the quick-release spacer bars 550qr) can be seen in FIGS. 5b and 5c along only one minor side, and along only one major side, of the first panel 530. In alternative embodiments, the hinges (and quick-release spacer bars) may be provided on only one side of the compartment 521, whether a minor side or a major side, with non-quick-release spacer bars provided on the remaining sides. Or, hinges and quick-release spacer bars may be provided on exactly three sides, or on all four sides, of the compartment 521.

Perforated or non-perforated screens, walls, sheets, skins, or the like can be applied to one, some, or all of the six side surfaces (front, back, left, right, top bottom) of one or both compartments 521, 522 (or all compartments if there are more than two), e.g. by screwing or otherwise attaching them to rails and/or spacer bars as appropriate, so as to completely or partially enclose the compartment. Alternatively, such screens, walls, sheets, etc. may be omitted in whole or in part to provide a fully or partially open frame construction.

Figure 6:
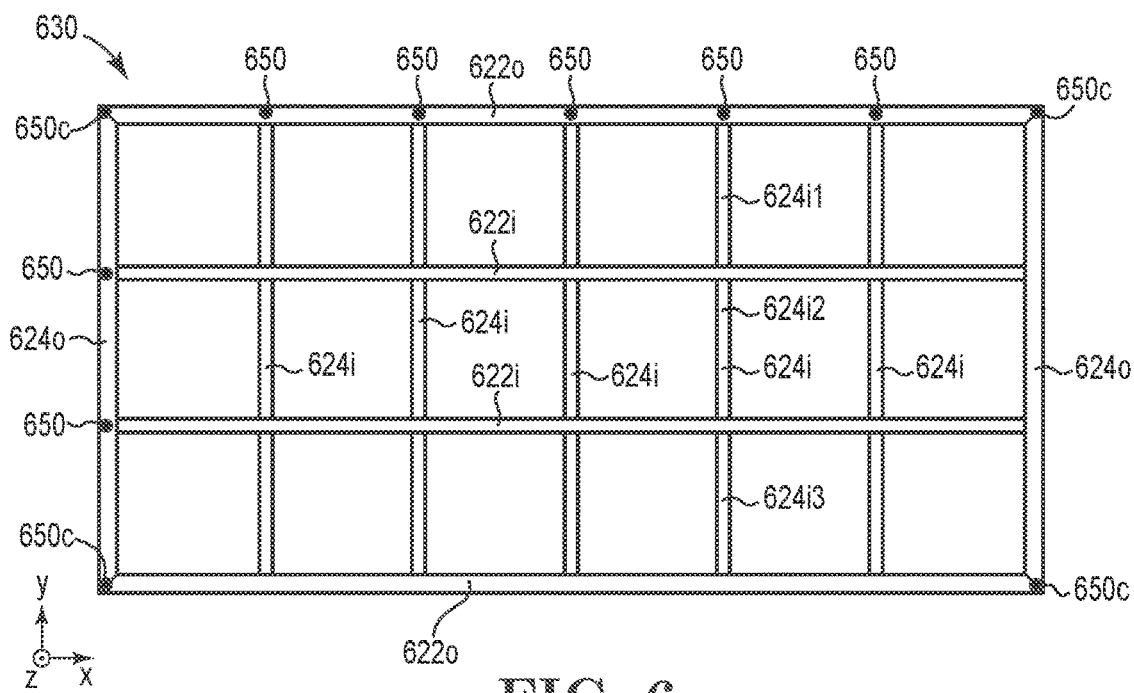
FIG. 6 is a schematic top or bottom view of an open frame panel that may be used as part of the two-tier storage structure.
Figure 7:
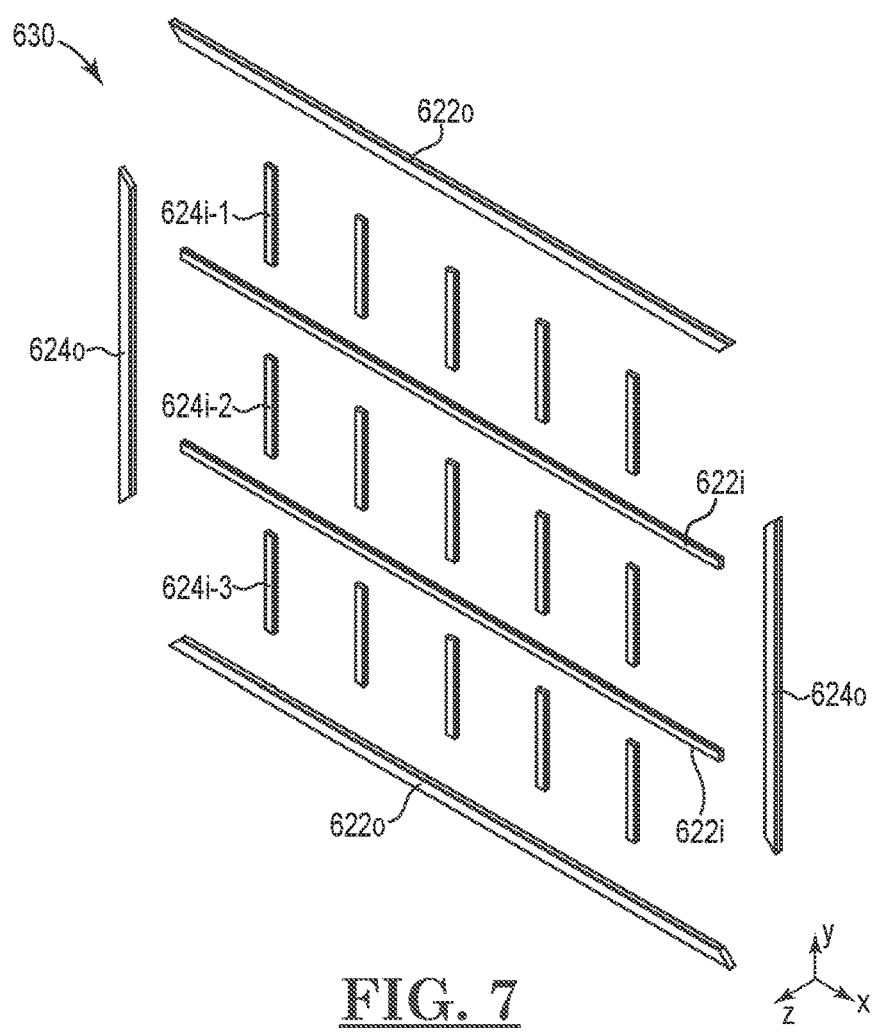
FIG. 7 is a schematic exploded view of the open frame panel of FIG. 6.

FIG. 6 shows an embodiment of an open frame panel 630 that may be used as part of the two-tier storage structure. The panel 630 may be the same as or similar to the other open frame panels shown or described herein. An exploded view of the panel 630 is shown in FIG. 7. Further information regarding such panels and related elements and features can be found in U.S. patent application U.S. Ser. No. 17/896,389, "Reconfigurable Open Frame Storage Structure", filed Aug. 26, 2022.

The panel 630 may be used as either or both the first (e.g. uppermost) panel or the second (e.g. middle) panel of the disclosed storage structures, and in some cases other panels of the storage structure, including the third (e.g. bottommost) panel of the structure. The panel 620 includes, or may consist of or consist essentially of, two groups of rails connected to each other to form a generally rectangular grid. The rails in each group of rails may be mutually parallel to each other, but the two groups are oriented perpendicular to each other. The group of rails that extend parallel to the longer side of the rectangular shape of the panel (along the x-axis) are referred to as major rails 622. The group of rails that extend parallel to the shorter side of the rectangular shape of the panel (along the y-axis) are referred to as minor rails 624. The outermost ones of the major rails 622 are designated major outer rails 622o, 622o. The major rails between and parallel to those outer rails are designated major inner rails 622i. The outermost ones of the minor rails 624 are designated minor outer rails 624o, 624o. The minor rails between and parallel to those outer rails are designated minor inner rails 624i.

For ease of manufacture, the major inner rails 622i are preferably each a single, unitary piece of metal or other suitable material, stretching continuously from the inner edge of one of the minor outer rails 624o to the inner edge of the other minor outer rail 624o. Attachment at those points of intersection may be by welding or other suitable permanent means. The two major outer rails 622o and the two minor outer rails 624o are also preferably each a single, unitary piece of metal or other suitable material. The ends of these outer rails may be cut at 45 degrees or as otherwise desired so that adjacent rails fit together to form corners of the panel, such pieces being welded or otherwise joined (whether permanently or not) along such angled edges.

In contrast, the minor inner rails are preferably constructed with a plurality of individual rail components. A given minor inner rail 624i may thus comprise rail components 624i1, 624i2, 624i3, placed in alignment with each other (collinear), and each welded in place between adjacent major rails, so as to form what we refer to as a minor inner rail 624i. The panel 620 has five such minor inner rails 624i.

The panel 630 may be characterized by an edge-to-edge width, measured along the y-axis between the outer edges of the two major outer rails 622o, and an edge-to-edge length, measured along the x-axis between the outer edges of the two minor outer rails 624o. The panel 630 may also be characterized by a center-to-center width, measured along the y-axis between the respective center lines of the two major outer rails 622o, and a center-to-center length, measured along the x-axis between the respective center lines of the two minor outer rails 624o.

Each of the various rails of the panel may be characterized by a longitudinal dimension (length) and transverse dimensions (width and depth, the width being the transverse dimension in the plane of the panel, and the depth being the transverse dimension perpendicular to the plane of the panel). Other dimensions of the panel 630 include a "rail spacing", as measured between any two neighboring or adjacent rails in a given set of rails (the major rails or the minor rails), measured perpendicular to the two rails and between their respective rail center lines.

In some embodiments, the length of the panel 630 (whether edge-to-edge or center-to-center) may be approximately 100 inches, or in a range from 96 to 110 inches, and the width of the panel 630 (whether edge-to-edge or center-to-center) may be approximately 50 inches, or in a range from 48 to 55 inches. The aspect ratio of the panel 630 may be approximately 2:1, or in a range from 1.9:1 to 1.98:1, or from 1.92:1 to 1.96:1, or about 1.94:1. The rail spacing of the major rails 622 may be uniform or nearly uniform, i.e., the same or nearly the same between any two adjacent major rails, and the rail spacing of the minor rails 624 may likewise be uniform or nearly uniform. The rail spacing may be approximately 16 inches for both of these sets of rails, except that each of the major outer rails 622o and each of the minor outer rails 624o may have a rail spacing to its nearest neighbor inner rail slightly greater than 16 inches, e.g. in a range from 16 to 17 inches.

Features or elements 650, 650c in FIG. 6 represent locations on the panel where spacer bars may be located to connect the panel to an adjacent panel. Corner spacer bars 650c are located at the four corners of the panel 630, and the remaining spacer bars 650 are located along a given outer rail between a given pair of corner spacer bars. The spacer bars 650, 650c may be affixed to the panel 650 in a permanent or semi-permanent fashion, e.g. by welding or by rivets, screws, bolts, or other threaded or non-threaded attachment. In the embodiment shown, the spacer bars 650 are provided along only one of the two major sides and along only one of the two minor sides of the panel. Such an arrangement anticipates the use of quick-release spacer bars along the other major side, and along the other minor side, of the panel, which has certain functional benefits when the panel is used for a storage container for use on a tilt trailer. In alternative embodiments, the non-quick-release spacer bars 650 (between the corners) may be provided along exactly three of the sides of the panel, or along exactly one of the sides of the panel, or along none of the sides of the panel, and quick-release spacer bars may be provided along any of the sides not provided with the spacer bars 650.

Figure 8:
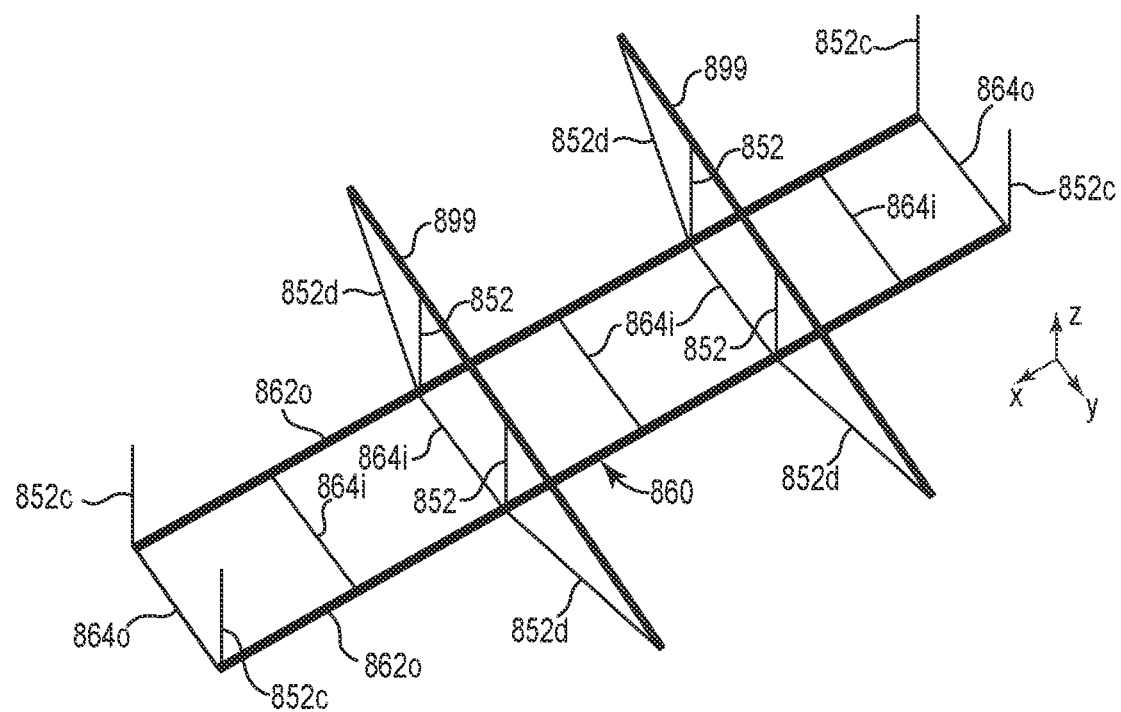
FIG. 8 is a schematic perspective view of a lower portion of a two-tier storage structure.

A highly schematic view of the lower portion of a two-tier storage structure, such as those discussed elsewhere herein, is provided in FIG. 8. This portion of the structure includes the third or lowest panel 860, comprised of major rails 862o, 862o and minor rails 864, the minor rails being made up of two minor outer rails 864o and five minor inner rails 864i between the two outer rails 864o. The minor rails 864 may have a uniform or substantially uniform rail spacing. Spacer bars connect the third panel 860 to the panel immediately above it (not shown), the spacer bars including spacer bars 852c disposed at the four corners of the panel 860, and additional spacer bars 852 at intermediate points between the corners. The spacer bars 852 may connect to the panel above only indirectly through the members 899, which may be the same as or similar to fork tubes 599 discussed above. The spacer bars 852, 852c may be generally perpendicular to the plane of the panel 860, and therefore also perpendicular to the respective planes of the other panels of the storage structure, and parallel to the z-axis. Tilted, slanted, or diagonal spacer bars 852d may also be provided for additional connection points between the panel 860 and the panel immediately above it.

Figure 9A:
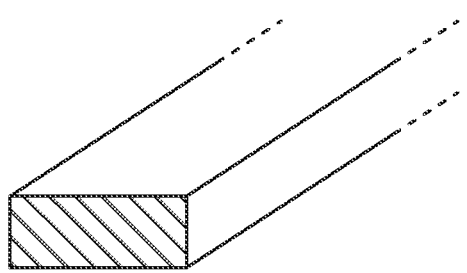
FIGS. 9a and 9b are schematic perspective views of different rails that may be used in the construction of any of the disclosed panels.
Figure 9B:
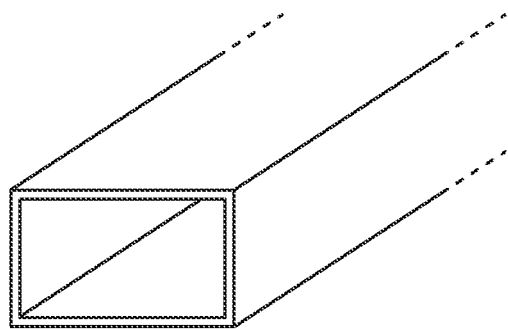

FIGS. 9a and 9b are schematic perspective views of some of the different types of rails that may be used in the construction of the disclosed panels. The rails in both of these figures have flat outer surfaces, which is advantageous so that a panel built from such rails can present a substantially flat, planar face via substantially coplanar, flat surfaces of the individual rails that make up the panel. However, in some embodiments, rails that have a round or otherwise curved cross-sectional shape may be used instead of the flat-shaped rails, or a given storage structure may incorporate some curved rails and some flat rails.

The rail of FIG. 9a is solid, whereas the rail of FIG. 9b is hollow. Although either may be used, the hollow version of FIG. 9b typically provides the advantage of being lighter. Furthermore, in cases where threaded holes are desired in the rails, the hollow version of FIG. 9b conveniently allows for threaded rivets to be embedded in the rail, to provide a threaded path (to receive the end of a bolt) that is longer than could be provided by a solid rail of practical dimensions. Typical dimensions of the cross-sectional shape of rails such as those of FIG. 9a or 9b may be, for example, 1×1 inch (square), 1×2 inches (rectangular), ¾×1.5 inches (rectangular), or other suitable sizes. Alternative rail designs to those of FIGS. 9a and 9b are also contemplated, e.g., round solid or round hollow rails, but are not preferred for most applications.

Figure 10:
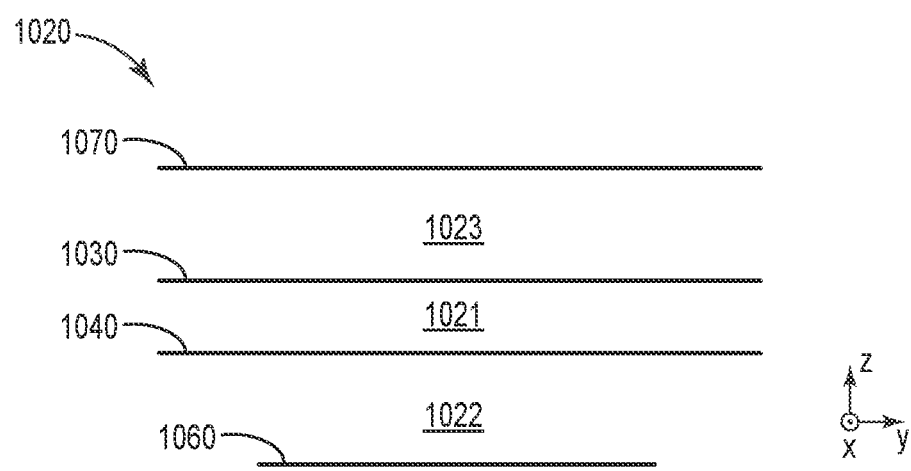
FIG. 10 is a highly schematic side or elevation view of a two-tier storage structure that incorporates a fourth panel, to provide a three-tier storage structure.

The disclosed two-tier storage structures may in some cases incorporate one or more additional panels to provide one or more additional interior storage spaces or compartments, for a total of three or more, in a stacked configuration. A highly schematic representation of such a storage structure is provided in FIG. 10. There, a storage structure 1020 has a first panel 1030, a second panel 1040, and a third panel 1060, forming storage spaces or compartments 1021 and 1022 as shown. These components and features may be the same or substantially the same as corresponding elements of other storage structures disclosed herein. Unlike those other storage structures, storage structure 1020 further includes a fourth panel 1070, disposed such that the panel 1030 lies between the panels 1070, 1040. An additional interior storage space or compartment 1023 is thus formed between the adjacent panels 1070, 1030, in a stacked arrangement with the compartments 1021, 1022.

The panel 1070 may be the same or substantially the same as panels 1030, 1040, e.g., having the same or similar overall length and width, numbers and spacings of rails, and so forth. Spacer bars connect the fourth panel 1070 to the first panel 1030, in like fashion to how spacer bars connect the first panel 1030 to the second panel 1040. The panels 1070, 1030, 1040 and their associated elements including spacer bars may be constructed and arranged in like fashion to the 3-panel storage systems described in the previously mentioned U.S. patent application U.S. Ser. No. 17/896,389.

Figure 11:
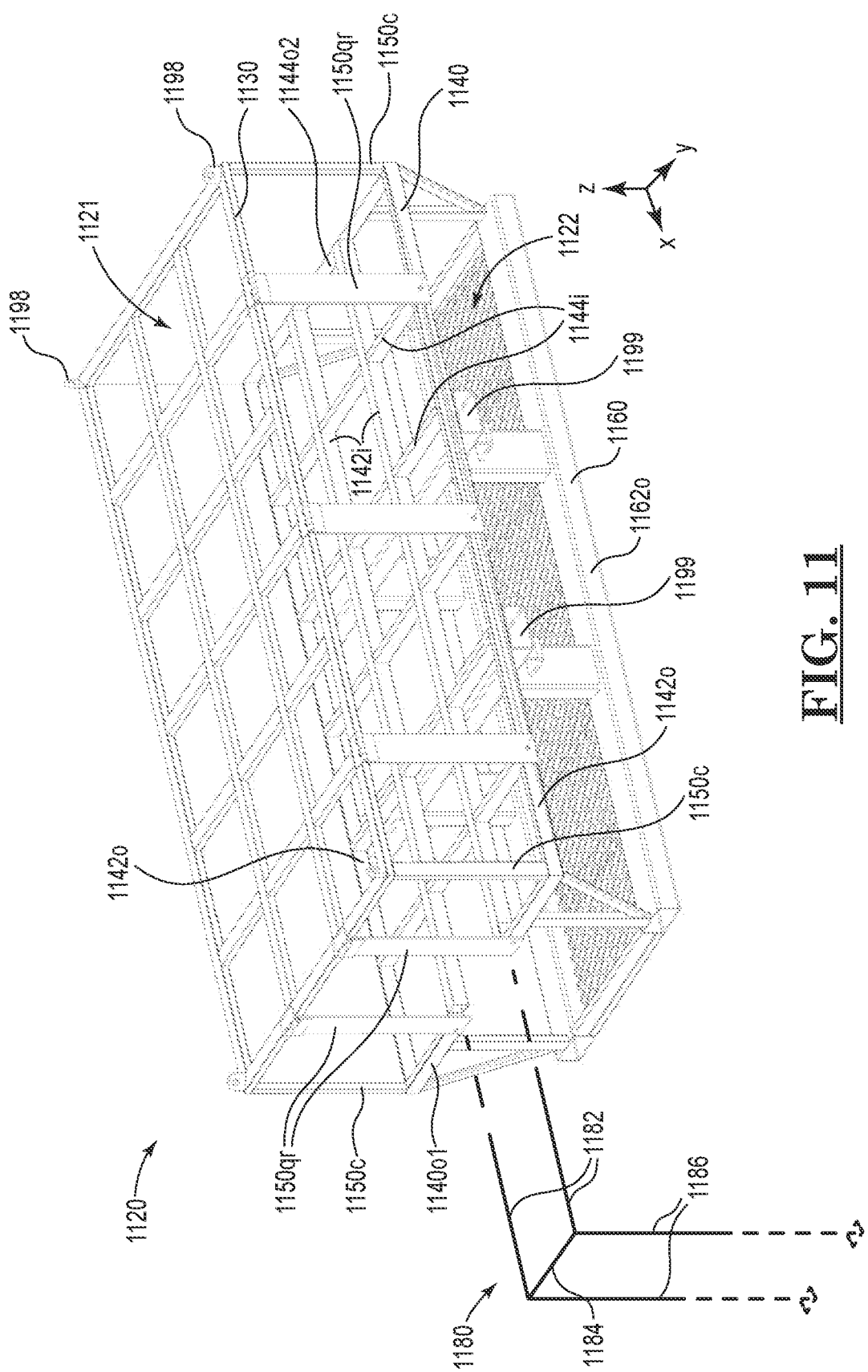
FIG. 11 is a schematic perspective view of a two-tier storage structure similar to that of FIGS. 5a-5g, except that the second panel has been modified to incorporate a pull-out unit to facilitate removing mats from, or loading mats into, the storage structure.

Turning then to FIG. 11, we see there a schematic perspective view of a two-tier storage structure 1120 similar to that of FIGS. 5a-5g, except that the second panel has been modified to incorporate a pull-out unit. The pull-out unit may be used, for example, to facilitate removing mats from, or loading mats into, the storage structure.

The storage structure 1120 has two adjacent storage compartments or cages, a first compartment 1121 defined between a first panel 1130 and a second panel 1140, and a second compartment 1122 defined between the second panel 1140 and a third panel 1160. All or substantially all of the individual components of the storage structure 1120 are preferably made of a suitable metal or metal alloy in order to provide the necessary stability and strength needed for holding and transporting large, heavy loads. Metals such as steel, stainless steel, aluminum, alloys thereof, or other suitable metals may be used.

The generally rectangular shape of the panel 1130 defines a long dimension, along the x-axis, and a short dimension, along the y-axis. The rails that make up the panel 1130 include major rails, extending generally parallel to the x-axis, and minor rails that extend generally parallel to the y-axis. The major rails are made up of two major outer rails and two major inner rails therebetween. The minor rails are likewise made up of two minor outer rails and a plurality of minor inner rails therebetween.

The second panel 1140 is much like the panel 1130, and much like the second panel 540 of FIG. 5a. In that regard the second panel 1140 is generally rectangular and of the same or similar size to the panel 1130, and contains a set of mutually parallel major rails and a set of mutually parallel minor rails. However, there are also significant differences. One difference involves the modification of at least two parallel rails of the second panel. In the depicted embodiment, the two major inner rails 1142i have been adapted to slidingly mate with two elements of a pull-out unit 1180, described further below. Thus in the figure one can see that the two major inner rails 1142i are larger in transverse dimension (cross-sectional size) than the major outer rails 1142o and than the major inner rails of the panel 540. This is so that the two elements of the pull-out unit 1180 can fit inside and slide back and forth inside the inner rails 1142i. Alternative mechanical couplings to provide sliding engagement of these parts are also contemplated.

Another difference between the panel 1140 and the panels 1130 or 540 is the incorporation of the pull-out unit 1180, such that the pull-out unit slidingly mates with two of the panel's rails, and a component of the pull-out unit is used as a portion of one of the other rails (one of the outer rails) of the panel 1140. In particular, the pull-out unit 1180 includes at least two parallel engagement arms 1182 that are tailored to mate with, and slidingly engage, the major inner rails 1142i. A handle member 1184 attaches to the engagement arms 1182, and preferably also to legs 1186 as shown. When the pull-out unit is in its fully inserted position, the handle 1184 forms part of one of the outer rails of the panel, in this embodiment, a minor outer rail 1144o1, located opposite the other minor outer rail 1144o2. (With reference to FIG. 11, the pull-out unit 1180, shown fully removed from the panel 1140, can be inserted into it only after swinging or otherwise moving out of the way the two quick-release spacer bars 1150qr from their depicted position.) On the other hand, when the pull-out unit 1180 is in its fully or partially extended position, it provides a shelf-like structure, formed by the exposed portions of engagement arms 1182 along with the handle 1184, that can greatly facilitate the removal or insertion of mats or other large-format materials (see e.g. mats 402 in FIG. 4b) out of or into the compartment 1121. In a loading process, mats can be placed partially into the compartment and partially on the shelf-like structure, and then pushed fully into the compartment 1121 by sliding. In an unloading process, mats can be partially removed from the compartment 1121 (with a portion of the mats resting on the shelf-like structure) by sliding, and then more fully removed thereafter.

The pull-out unit may be constructed from metal stock such as tubing or other suitable materials, such as those used in the construction of any or all of the panels 1130, 1140, or 1150.

Another difference between the panel 1140 and the panels 1130 or 540 is that the rails of the panel 1140 other than the rails 1142i (which other rails are of rectangular cross-sectional shape) are in a 90 degree rotated orientation relative to the corresponding rails of panels 1130 or 540, such that the long dimension of the cross-sectional shape of each of these other rails is perpendicular to the plane of the panel 1140 (i.e., parallel to the z-axis), rather than being parallel to the plane of the panel as in panels 1130 and 540. This changed orientation of the remaining rails of the panel 1140 provides greater structural strength along the vertical direction (z-axis) and provides the panel 1140 with a more uniform thickness as among the various rails that comprise it. Stated differently, the changed orientations of the remaining rails of the panel 1140 make them closer in thickness (measured along the z-axis) to that of the modified rails 1142i.

The first and second panels 1130, 1140 are held together in a spaced-apart relationship by spacer bars, including corner spacer bars 1150c, permanent or semi-permanent intermediate spacer bars (not labeled but located between pairs of the corner spacer bars), and quick-release spacer bars 1150qr. Two of the spacer bars 1150qr, located at the minor end of the compartment 1121, operate to hold the pull-out unit 1180 in place when the spacer bars 1150qr are in their engaged or locked position, and allow the pull-out unit 1180 to be fully or partially removed when the spacer bars 1150qr are unlocked or disengaged from the minor outer rail 1144o1.

The storage structure 1120 also has a third panel 1160 and spacer bars that connect the third panel to the second panel 1140, which components may be the same as or similar to corresponding components of the storage structures described above. A second compartment 1122 is formed between the third panel 1160 and the second panel 1140. When the pull-out unit 1180 is fully inserted into the panel 1140, the legs 1186 of the pull-out unit may serve to obstruct the minor side of the compartment 1122 by extending from the minor outer rail 1144o1 of the second panel to the underlying minor outer rail (not labeled) of the third panel 1160.

Figure 12A:
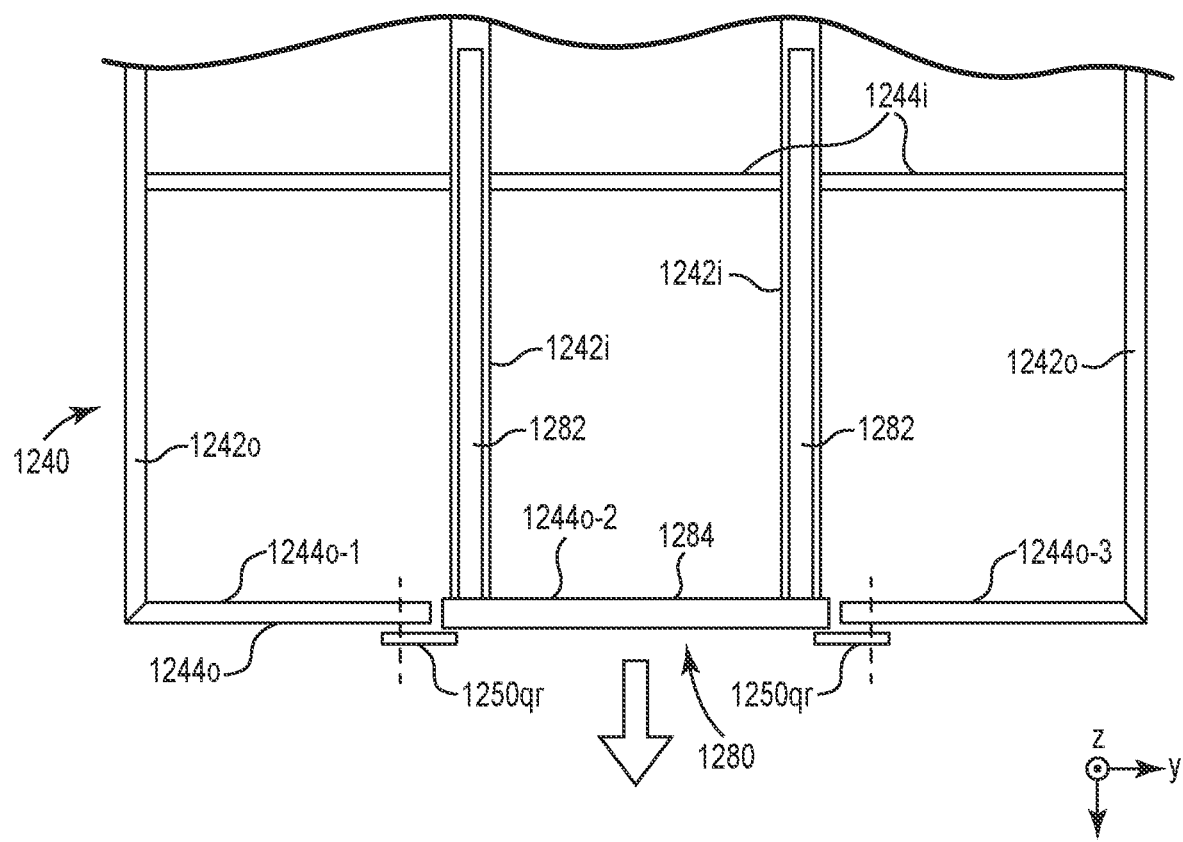
FIGS. 12a and 12b are schematic top or plan views of a panel for use in a storage structure, the panel configured to incorporate a pull-out unit.
Figure 12B:
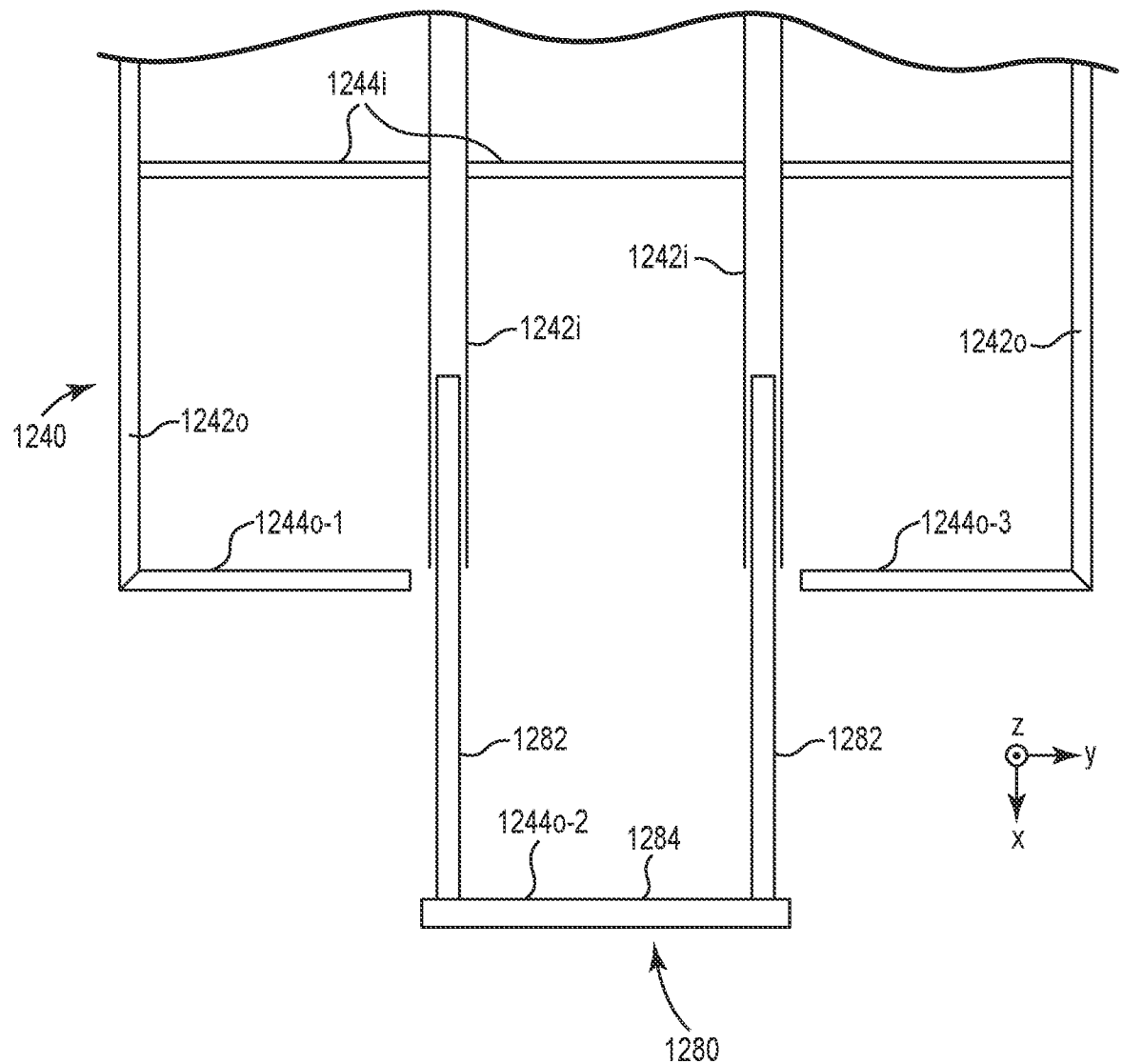

FIGS. 12a and 12b provide enlarged schematic views of a portion of a second panel that is used to mate with a pull-out unit such as the one described above. In FIG. 12a the pull-out unit is fully engaged with, or inserted into, the second panel, whereas in FIG. 12b the pull-out unit is fully or partially disengaged with, or withdrawn from, the second panel.

The second panel 1240 may be the same as or similar to panel 1140 of FIG. 11. Thus, the second panel 1240 includes major rails, including major outer rails 1242o, 1242o and major inner rails 1242i, 1242i, and minor rails, including a minor outer rail 1244o and a minor inner rail 1244i. The minor inner rail 1244i is similar to other minor inner rails disclosed herein insofar as it comprises separate rail components that are welded or otherwise fixed in place in a collinear relationship with each other to form what we consider to be a single minor rail. However, unlike other minor outer rails disclosed herein, the minor outer rail 1244o of panel 1240 is not a unitary bar or rail, but is composed of separate rail components like the minor inner rail 1244i. With the pull-out unit 1280 fully inserted into the second panel (FIG. 12a), the handle 1284 forms one portion 1244o-2 of the minor outer rail 1244o, along with the other rail components 1244o-1 and 1244o-3, these three rail components being collinearly arranged to form the outer rail 1244o. But although the rail components 1244o-1, 1244o-2, and 1244o-3 are collinearly arranged, they are not rigidly or fixedly connected together, because they allow for one of the components, the component 1244o-2 corresponding to the handle 1284 of the pull-out unit 1280, to be easily moved out of its collinear position with the other rail components. The pull-out unit 1280 is shown in its fully or partially withdrawn position in FIG. 12b.

Figure 13:
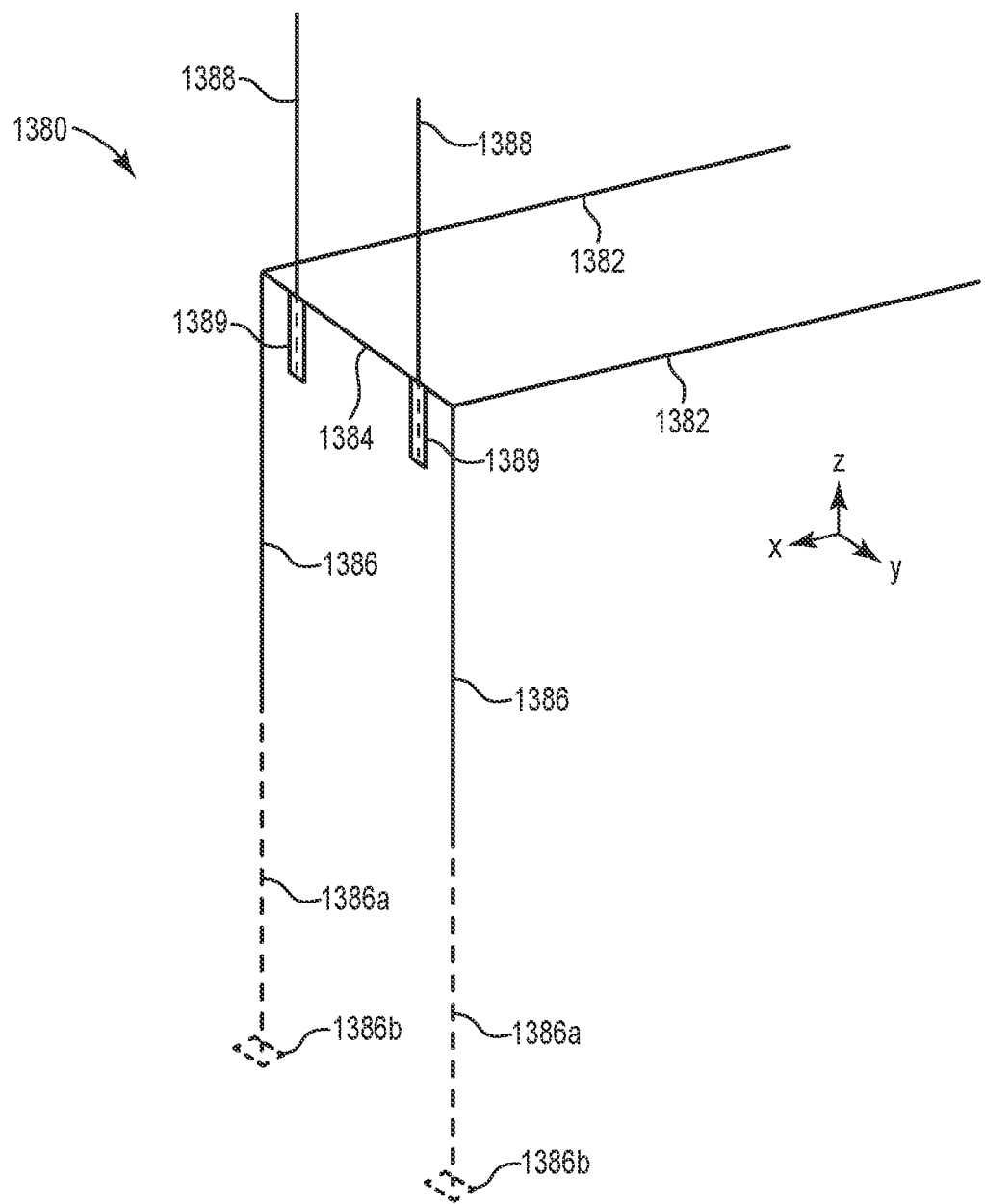
FIG. 13 is a schematic perspective view of a pull-out unit for use with the disclosed storage structures.

FIG. 13 is a schematic perspective view of a pull-out unit 1380 for use with the disclosed storage structures. The pull-out unit 1380 may be the same as or similar to the pull-out units 1180 or 1280 previously described. The pull-out unit 1380 includes at least two parallel engagement arms 1382 permanently attached (e.g. welded) to a straight section 1384 that serves as a handle for pulling the unit 1380 out of, or pushing the unit 1380 into, the second panel of the storage structure. As described above, the handle 1384 can also form a portion of an outer rail of the second panel.

Also connected to the handle 1384 are legs 1386, which as explained above may be used to block entrance to the minor side of the second compartment when the pull-out unit is fully inserted into its mating panel. The legs 1386, the handle 1384, and the engagement arms 1382 may be oriented in a mutually orthogonal fashion, with the legs 1386 extending parallel to the z-axis, the handle 1384 extending parallel to the y-axis, and the engagement arms extending parallel to the x-axis. In applications where the disclosed storage structures are used on the stationary deck of a tilt trailer, it is useful to include slidable leg extensions 1386a and optional feet 1386b such that the feet 1386 rest on the ground (where the tilt trailer is parked), thus providing supporting structure from the ground directly to the handle 1384.

The pull-out unit can also include pocket features 1389, which may be permanently or otherwise attached to the handle 1384, and may be configured to receive removeable stop bars 1388. The stop bars 1388 may be used to prevent mats being removed from or loaded into the storage structure from sliding off of the shelf-like structure formed by the handle and the engagement arms. The stop bars may be completely removeable from the storage structure and attached thereto by suitable brackets and pins, or the like. The pocket features 1389 and stop bars 1388 may be tailored such that the stop bars are substantially vertical, i.e., oriented parallel to the z-axis, when engaged in the pocket features 1389.

The pull-out unit of FIG. 11 is shown as engaging with the second panel at the minor side of the storage structure. This is advantageous for tilt trailer applications, because the minor side of the storage structure faces the side of the trailer where workers will be standing and working. The storage structure may incorporate only one such pull-out unit, as shown in FIG. 11, or it may incorporate two such units, which may or may not be substantially identical to each other, one on each of the two minor sides of the storage structure. The pull-out units are shown in the figures as having only two engagement arms, but in alternative embodiments they may have (at least) three such engagement arms, to engage (at least) three parallel rails of the second panel, whereupon the handle would be (at least) twice the length shown in FIGS. 11, 12a-12b, and 13. Alternative embodiments of the storage structure may include (in addition to or instead of the pull-out unit(s) at one or both minor sides of the storage structure) a pull-out unit provided at one or both of the major sides of the second panel, in which case the engagement arms of such alterative pull-out unit(s) would engage two or more minor inner rails of the second panel.

Numerous modifications can be made, and numerous features added, to the storage systems and storage structures disclosed herein.

Unless otherwise indicated, all numbers expressing quantities, measured properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

The use of relational terms such as "top", "bottom", "upper", "lower", "above", "below", and the like to describe various embodiments are merely used for convenience to facilitate the description of some embodiments herein. Notwithstanding the use of such terms, the present disclosure should not be interpreted as being limited to any particular orientation or relative position, but rather should be understood to encompass embodiments having any orientations and relative positions, in addition to those described above.

Various modifications and alterations of this invention will be apparent to those skilled in the art without departing from the spirit and scope of this invention, which is not limited to the illustrative embodiments set forth herein. The reader should assume that features of one disclosed embodiment can also be applied to all other disclosed embodiments unless otherwise indicated. All U.S. patents, patent application publications, and other patent and non-patent documents referred to herein are incorporated by reference, to the extent they do not contradict the foregoing disclosure.

What is claimed is:

1. A storage structure, comprising:
a first panel being generally rectangular in shape, having four corners, and including first major rails and first minor rails, the first major rails being mutually parallel and including two first major outer rails, the first minor rails being mutually parallel and including two first minor outer rails;
a second panel being generally rectangular in shape, having four corners, and including second major rails and second minor rails, the second major rails being mutually parallel and including two second major outer rails, the second minor rails being mutually parallel and including two second minor outer rails, the first and second panels having substantially the same overall lengths and widths;
first spacer bars connecting the first panel to the second panel to form a first compartment therebetween, the first compartment having a first and second opposed major side and a first and second opposed minor side; and
a third panel attached to the second panel such that a second compartment is formed between the third panel and the second panel, the third panel having an overall length substantially equal to those of the first and second panels, but having an overall width less than those of the first and second panels;
wherein the first spacer bars include one non-quick-release corner spacer bar at each of the four corners of the first and second panels, the first spacer bars also including a first group of quick-release spacer bars.

2. The storage structure of claim 1, wherein the first group of quick-release spacer bars selectively obstruct the first minor side of the first compartment.

3. The storage structure of claim 2, wherein the first spacer bars further include a second group of quick-release spacer bars that selectively obstruct the first major side of the first compartment.

4. The storage structure of claim 3, wherein the first spacer bars further include non-quick-release spacer bars that obstruct the second major side of the first compartment between two corner spacer bars, and non-quick-release spacer bars that obstruct the second minor side of the first compartment between two corner spacer bars.

5. The storage structure of claim 1, wherein each of the quick-release spacer bars is connected to one of the first and second panels by a hinge, and to the other of the first and second panels by a quick-release mechanism.

6. The storage structure of claim 1, further comprising:
two major fork tubes extending parallel to the first major rails of the first panel, each of the major fork tubes being configured to receive a fork of a forklift truck.

7. The storage structure of claim 6, wherein the two major fork tubes form part of the third panel.

8. The storage structure of claim 1, further comprising:
two minor fork tubes extending parallel to the first minor rails of the first panel, each of the minor fork tubes being configured to receive a fork of a forklift truck.

9. The storage structure of claim 8, wherein the two minor fork tubes are disposed between the second panel and the third panel.

10. The storage structure of claim 1, further comprising:
a pullout unit that includes two generally parallel engagement arms and a handle that connects the engagement arms, the engagement arms being adapted to slidingly mate with two of the second major rails or two of the second minor rails.

11. The storage structure of claim 10, wherein the second major rails include two second major inner rails disposed parallel to and between the two second major outer rails, and the engagement arms are adapted to slidingly mate with the two second major inner rails.

12. The storage structure of claim 11, wherein one of the two second minor outer rails includes three collinear but separated rail components, one of the separated rail components being the handle of the pullout unit.

13. The storage structure of claim 10, wherein the pullout unit further includes two generally parallel leg members that are oriented perpendicular to the engagement arms and perpendicular to the handle.

14. The storage structure of claim 1, further comprising:
a fourth panel being generally rectangular in shape, having four corners, and including fourth major rails and fourth minor rails, the fourth major rails being mutually parallel and including two fourth major outer rails, the fourth minor rails being mutually parallel and including two fourth minor outer rails, the first and fourth panels having substantially the same overall lengths and widths; and
second spacer bars connecting the first panel to the fourth panel such that the first panel is disposed between the fourth panel and the second panel, wherein a third compartment is formed between the first panel and the fourth panel.

15. A storage structure, comprising:
a first, second, and third panel being disposed such that a first compartment is formed between the first panel and the second panel, and a second compartment is formed between the second panel and the third panel, the first compartment having a first and second opposed major side and a first and second opposed minor side;
the first panel being generally rectangular in shape, having four corners, and including first major rails and first minor rails, the first major rails including two first major outer rails and at least one first major inner rail between the two first major outer rails, the first minor rails including two first minor outer rails and a plurality of first minor inner rails between the two first minor outer rails;
the second panel being generally rectangular in shape, having four corners, and including second major rails and second minor rails, the second major rails including two second major outer rails and at least one second major inner rail between the two second major outer rails, the second minor rails including two second minor outer rails and a plurality of second minor inner rails between the two second minor outer rails;
first spacer bars connecting the first panel to the second panel; and
a pullout unit that includes two engagement arms and a handle that connects the engagement arms, the engagement arms being adapted to slidingly mate with two of the rails of the second panel.

16. The storage structure of claim 15, wherein the third panel has an overall length substantially equal to those of the first and second panels, but has an overall width less than those of the first and second panels.

17. The storage structure of claim 15, wherein the first spacer bars include one non-quick-release corner spacer bar at each of the four corners of the first and second panels, the first spacer bars also including a first group of quick-release spacer bars disposed between a first pair of the non-quick-release corner spacer bars.

18. The storage structure of claim 15, wherein the engagement arms slidingly mate with two of the second major rails.

19. The storage structure of claim 15, wherein the pullout unit further includes two leg members that are each oriented perpendicular to the engagement arms and perpendicular to the handle.

20. The storage structure of claim 15, further comprising:
two major fork tubes extending parallel to the first major rails of the first panel, each of the major fork tubes being configured to receive a fork of a forklift truck.

* * * * *